United States Patent [19]

Schwartzbeck

[11] 3,713,807
[45] Jan. 30, 1973

[54] HERBICIDAL METHOD FOR COMBATING SHATTERCANE

[75] Inventor: Richard A. Schwartzbeck, Olathe, Kans.

[73] Assignee: Gulf Research Development Company, Pittsburgh, Pa.

[22] Filed: June 11, 1970

[21] Appl. No.: 45,575

Related U.S. Application Data

[63] Continuation-in-part of Ser. No. 853,475, Aug. 27, 1969.

[52] U.S. Cl..........................................71/93, 71/118
[51] Int. Cl. .................................................A01n 9/22
[58] Field of Search..................................71/93, 118

[56] References Cited

UNITED STATES PATENTS

| | | | |
|---|---|---|---|
| 3,442,945 | 5/1969 | Olin | 71/93 |
| 3,503,971 | 3/1970 | Neighbors et al. | 71/93 |
| 3,551,132 | 12/1970 | Husted | 71/118 |

*Primary Examiner*—James O. Thomas, Jr.
*Attorney*—Richard L. Kelly, Carl A. Cline, Forrest D. Stine and Howard F. Van Denburgh

[57] ABSTRACT

A two-component herbicide combination consisting essentially of 2-chloro-4-cyclopropylamino-6-isopropylamino-s-triazine and alachlor gives better control of certain weeds than either of these herbicides alone. Pre-emergence use of the combination on corn gives a wide spectrum of weed control without injury to the corn.

1 Claim, No Drawings

HERBICIDAL METHOD FOR COMBATING SHATTERCANE

This is a continuation-in-part of U. S. Pat. application Ser. No. 853,475 filed Aug. 27, 1969.

DESCRIPTION OF THE INVENTION

In the parent application it was disclosed that 2-chloro-4-cyclopropylamino-6-isopropylamino-s-triazine interacts in an interesting manner with certain other herbicidal compounds to product combinations superior to either herbicide alone when used in certain specific weed control situations. It has now been discovered that the combination of this herbicide with 2-chloro-2',6'-diethyl-N-(methoxy-methyl)acetanilide (alachlor) may be used at relatively low levels of application to control unwanted vegetation such as morning glory and velvet leaf more effectively than either of the compounds used alone. By using a lower level of application of the more effective combination, injury to the crop plants is minimized.

Briefly, the present invention is a method of combating unwanted vegetation comprising applying pre-emergently to the locus of the vegetation an effective amount of a mixture consisting essentially of one part by weight of 2-chloro-4-cyclopropylamino-6-isopropylamino-s-triazine and from about one to about three parts by weight of 2-chloro-2',6'-diethyl-N-(methoxy-methyl)acetanilide.

COMBATING UNWANTED VEGETATION

So as to illustrate the use of the method of combating unwanted vegetation under controlled conditions to yield meaningful quantitative data there is described below a group of comparative greenhouse tests.

Expanded polystyrene flats or trays about 2 ½ inches deep were filed with soil and seeded with the following species, corn, milo (grain sorghum) shattercane, barnyard grass, green foxtail, crabgrass, morning glory, velvet leaf, nut grass, and yellow foxtail. The two herbicides were applied separately and in combinations at various levels by spraying on top of the soil on which seeds were planted. The seeds were not covered with additional soil. A set of seeded flats was sprayed only with water containing no herbicide and was placed on the greenhouse bench and given the same amount of sunlight and moisture as the other flats for purposes of comparison.

After 20 days comparative observations were made and the extent of control or injury to the plants estimated as a percentage figure is shown in the following table. These results are given along with figures on the height of the plants in the check experiment in which no herbicide was employed.

RESULTS OF PRE-EMERGENCE GREENHOUSE TESTS ON HERBICIDE COMBINATIONS

| Treatment (lb./A.) | Corn | Grain sorghum | Shatter-cane | Barnyard grass | Green foxtail | Crab-grass | Morning glory | Velvet leaf | Nut grass | Yellow foxtail |
|---|---|---|---|---|---|---|---|---|---|---|
| Check height, inches | 11 | 8 | 8 | 10 | 3½ | ¾ | 3 | 2½ | 5 | 3½ |
| ¾ lb. alachlor | 0 | 0 | 80 | 90 | 100 | 100 | 0 | 0 | 0 | 90 |
| 1 lb. alachlor | 0 | 80 | 90 | 100 | 100 | 100 | 0 | 0 | 0 | 95 |
| 1½ lb. alachlor | 0 | 80 | 90 | 100 | 100 | 100 | 0 | 0 | 0 | 90 |
| 2 lb. alachlor | 0 | 80 | 90 | 100 | 100 | 100 | 0 | 0 | | 90 |
| 3 lb. alachlor | 0 | 80 | 90 | 100 | 100 | 100 | 0 | 0 | 0 | 100 |
| ¼ lb. triazine | 0 | 0 | 0 | 0 | 0 | 0 | 80 | 20 | 0 | 0 |
| ½ lb. triazine | 0 | 0 | 0 | 20 | 20 | 0 | 90 | 95 | 0 | 0 |
| ¾ lb. triazine | 0 | 0 | 0 | 95 | 80 | 100 | 100 | 100 | 0 | 90 |
| 1 lb. triazine | 0 | 0 | 0 | 100 | 95 | 100 | 100 | 100 | 0 | 80 |

RESULTS OF PRE-EMERGENCE GREENHOUSE TESTS ON HERBICIDE COMBINATIONS

| Treatment (lb./A.) | Corn | Grain sorghum | Shatter-cane | Barnyard grass | Green foxtail | Crab-grass | Morning glory | Velvet leaf | Nut grass | Yellow foxtail |
|---|---|---|---|---|---|---|---|---|---|---|
| ¾ lb. alachlor and ¼ lb. triazine | 0 | 0 | 80 | 100 | 100 | 100 | 80 | 100 | 0 | 90 |
| ½ lb. alachlor and ½ lb. triazine | 0 | 0 | 80 | 100 | 100 | 100 | 100 | 100 | 0 | 100 |
| 1½ lb. alachlor and ¾ lb. triazine | 0 | 100 | 90 | 100 | 100 | 100 | 100 | 100 | | 95 |
| 2 lb. alachlor and 1 lb. triazine | 0 | 90 | 100 | 100 | 100 | 100 | 100 | 100 | 0 | 100 |

It will be seen from examination of the tabulated data that the alachlor herbicide is ineffective on morning glory and velvet leaf even at rates as high as 3 lb per acre. The triazine also fails to give complete control of these two weeds at application rates below three-fourths lb per acre. However, it will be seen that the combination of one-half lb of alachlor and one-half lb of triazine gives complete control of both morning glory and velvet leaf and does so without injury to either corn or grain sorghum. An improvement in the control of yellow foxtail is also evident at the rate of one-half lb of each herbicide. For serious weed infestation in corn, as can be seen from the tabulated data, higher rates of application can be used to give substantially complete control of all of the weeds in the test, with the exception of nut grass, without substantial injury to corn. The two herbicides may be applied simultaneously from separate spray mixes through separate spray nozzles or wettable powders or dispersible concentrates of each of the two herbicides may be conveniently mixed in a spray tank so that the combination is sprayed together. Alternative mixtures of the two herbicides may be prepared in suitable form, for example, as wettable powers, so that only one mixing operation in the spray tank is necessary. The preferred use of the combination is the pre-emergence control of weeds in corn where the weed infestation is particularly serious.

I claim:

1. The method of combating shattercane in the presence of corn comprising applying pre-emergently to the locus of the shattercane an effective amount of a mixture consisting essentially of one part by weight of 2-chloro-4-cyclopropylamino-6-isopropylamino-s-triazine and from about one to about three parts be weight of 2-chloro-2', 6'-diethyl-N- (methoxymethyl)-acetanilide.

* * * * *